(12) United States Patent
Howarth et al.

(10) Patent No.: US 9,838,802 B1
(45) Date of Patent: Dec. 5, 2017

(54) UNDERWATER ACOUSTIC CARBON NANOTUBE THERMOPHONE

(71) Applicants: Thomas R Howarth, Portsmouth, RI (US); Dehua Huang, Newport, RI (US)

(72) Inventors: Thomas R Howarth, Portsmouth, RI (US); Dehua Huang, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/273,801

(22) Filed: Sep. 23, 2016

(51) Int. Cl.
*H04R 23/00* (2006.01)
*G01S 7/521* (2006.01)

(52) U.S. Cl.
CPC ............ *H04R 23/002* (2013.01); *G01S 7/521* (2013.01)

(58) Field of Classification Search
CPC ............ H04R 23/002; H04R 2201/028; H04R 2205/021; G01S 7/521
See application file for complete search history.

(56) References Cited

U.S. PATENT DOCUMENTS

| | | | |
|---|---|---|---|
| 9,340,262 B1 | 5/2016 | Boyd et al. | |
| 2010/0054503 A1* | 3/2010 | Jiang | H04R 23/002 381/164 |
| 2010/0172213 A1* | 7/2010 | Qian | H04R 23/002 367/140 |
| 2010/0172214 A1* | 7/2010 | Qian | H04R 23/002 367/140 |
| 2010/0172215 A1* | 7/2010 | Liu | H04R 23/002 367/140 |
| 2010/0172216 A1* | 7/2010 | Liu | H04R 23/002 367/140 |
| 2010/0188933 A1* | 7/2010 | Qian | H04R 23/002 367/140 |
| 2010/0188934 A1* | 7/2010 | Qian | H04R 23/002 367/140 |
| 2010/0188935 A1* | 7/2010 | Qian | H04R 23/002 367/140 |
| 2010/0189296 A1* | 7/2010 | Qian | H04R 23/002 381/345 |
| 2010/0195849 A1* | 8/2010 | Qian | H04R 23/002 381/120 |
| 2012/0000293 A1* | 1/2012 | Baughman | H02N 1/006 381/164 |
| 2016/0037267 A1* | 2/2016 | Aliev | H04R 23/002 381/164 |

* cited by examiner

*Primary Examiner* — Daniel Pihulic
(74) *Attorney, Agent, or Firm* — James M. Kasischke; Michael P. Stanley

(57) ABSTRACT

A carbon nanotube thermophone is provided which includes a urethane frame having mounting holes at corners of the frame. Screw holes in the frame are provided for a cable holder. A square shaped carbon nanotube material chip is positioned within the urethane frame. The carbon nanotube material chip can comprise multiple carbon nanotube sheets to electrically tune the impedance to match a driving amplifier impedance load. Wooden spacers assist in positioning the carbon nanotube material chip. A first end of a cable is soldered to the carbon nanotube material chip at electrodes of the material chip. A high temperature rated silicon sealant is used for attachment points on the thermophone.

9 Claims, 2 Drawing Sheets

UNDERWATER ACOUSTIC CARBON NANOTUBE THERMOPHONE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

The present application relates to U.S. patent application Ser. No. 15/270,166; filed 20 Sep. 2016, entitled "PASSIVE MODE CARBON NANOTUBE UNDERWATER ACOUSTIC TRANSDUCER" and U.S. patent application Ser. No. 15/273,817; filed 23 Sep. 2016, entitled "A CARBON NANOTUBE UNDERWATER ACOUSTIC THERMOPHONE".

BACKGROUND OF THE INVENTION

(1) Field of the Invention

The present invention is an acoustically transparent carbon nanotube underwater acoustic source which acts as a thermophone based on an energy conversion of heat to sound.

(2) Description of the Prior Art

The principle of thermal acoustic transduction is that when alternating current is passed through a comparatively thin transducer; periodic heating takes place in the conductor following variations in current strength. This periodic heating produces temperature waves which propagate into a surrounding medium. The amplitude of the temperature wave decreases rapidly as the distance from the conductor increases. Based on the rapid production of these temperature waves; the net effect is to produce a periodic rise in temperature in a limited portion of the medium near the conductor. Thermal expansion and contraction of this layer of the medium determines the amplitude of the resulting sound waves.

Traditional acoustic transduction begins with the generation of electrical excitation pulsed through an amplifier into an electro-acoustic material (such as a piezoelectric ceramic, piezocomposite, or a magnetostrictive ferromagnetic compound). This electrical excitation creates a mechanical vibration that is then converted into an acoustic wave to produce sound. The lower the preferred transmitting frequency (and hence a longer acoustic detection range) desired; the larger the size of the conventional transducer that is required.

Often, for acoustic projectors producing sound at frequencies below a few kHz; the electroacoustic device needs to be comparatively very large in order to produce long sound waves. The large size of the device can be a serious limitation for incorporating low-frequency, long-range detection sonars on autonomous underwater vehicles (AUVs).

Recently, there has been development of underwater acoustic carbon nanotube (CNT) yarn sheets capable of producing high acoustic output at low frequencies with broad bandwidth. An underwater acoustic transmitter is feasible in which the transmitter uses thermal means to heat CNT substrates and in which a low frequency acoustic projector is formed. The acoustic carbon nanotubes can act as transducers while having a comparatively small volumetric size. The principle transduction for acoustic carbon nanotubes is through thermal acoustics as opposed to conventional underwater transducers that utilize electromechanical vibrations.

However, a problem with using carbon nanotubes is that the nanotubes are quite fragile and are susceptible to disintegration especially if the nanotube fibers are touched or moved too quickly. A bare nanotube configuration also has a serious risk of damage when being transported and handled.

Still another problem is using the CNT yarn sheets in a high power conventional wave operation in water. This type of use overheats the CNT sheets as well as any encapsulate gaskets and housing such that the temperature can rise to an unacceptable level as to induce thermal fatigue within the materials. As such, when making a CNT thermophone, encapsulating materials need to include provisions for high temperature.

SUMMARY OF THE INVENTION

It is therefore a primary object and general purpose of the present invention to optimize an acoustic thermophone source that can convert heat into sound.

It is a further object of the present invention to provide a low frequency sound source in a comparatively thin transducer.

It is a still further object of the present invention to provide a thermophone with an electrical input impedance of less than 100 Ohms by electrically wiring carbon nanotube sheets with the specific impedance achieved by wiring electrically in series (or parallel) of carbon nanotube (CNT) yarn multi-sheets.

In order to attain the objects of the invention, a carbon nanotube thermophone is provided. The thermophone comprises mechanical, acoustical and electrical sections. The mechanical section is a urethane frame with mounting holes, screw holes for a cable holder and holes for routing wire. The acoustic section of the thermophone is a carbon nanotube material chip. The chip is positioned within the urethane frame. Wooden spacers position the carbon nanotube material chip.

The electrical section of the thermophone includes a cable pigtail and a transducer cable. A first end of the cable pigtail is soldered to the carbon nanotube material chip at electrodes of the material chip. The other end of the cable pigtail is electrically connected to the transducer cable. A silicon sealant material is used to for attachment points on the thermophone.

BRIEF DESCRIPTION OF THE DRAWINGS

Reference is made to the accompanying drawings in which are shown an illustrative embodiment of the invention, from which its novel features and advantages will be apparent, wherein corresponding reference characters indicate corresponding parts throughout the several views of the drawings and wherein.

DETAILED DESCRIPTION OF THE INVENTION

Figure 1:
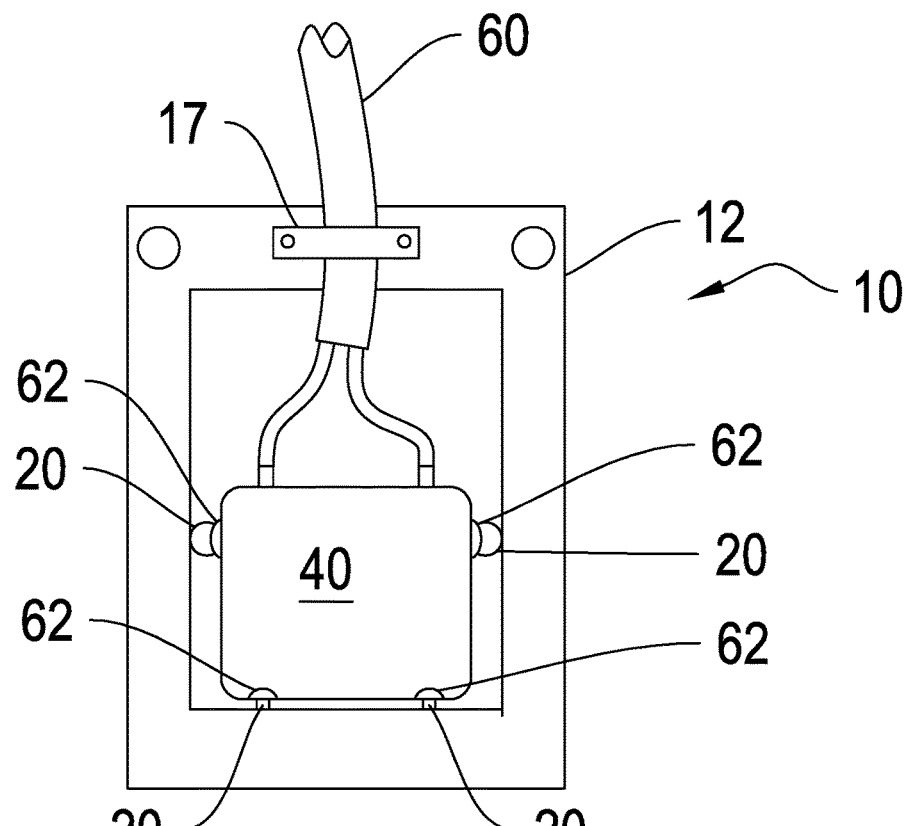
FIG. 1 depicts a thermophone of the present invention.

In FIG. 1, a carbon nanotube (CNT) thermophone 10 of the present invention is shown. The CNT thermophone 10 comprises mechanical, acoustical and electrical sections.

Figure 2:
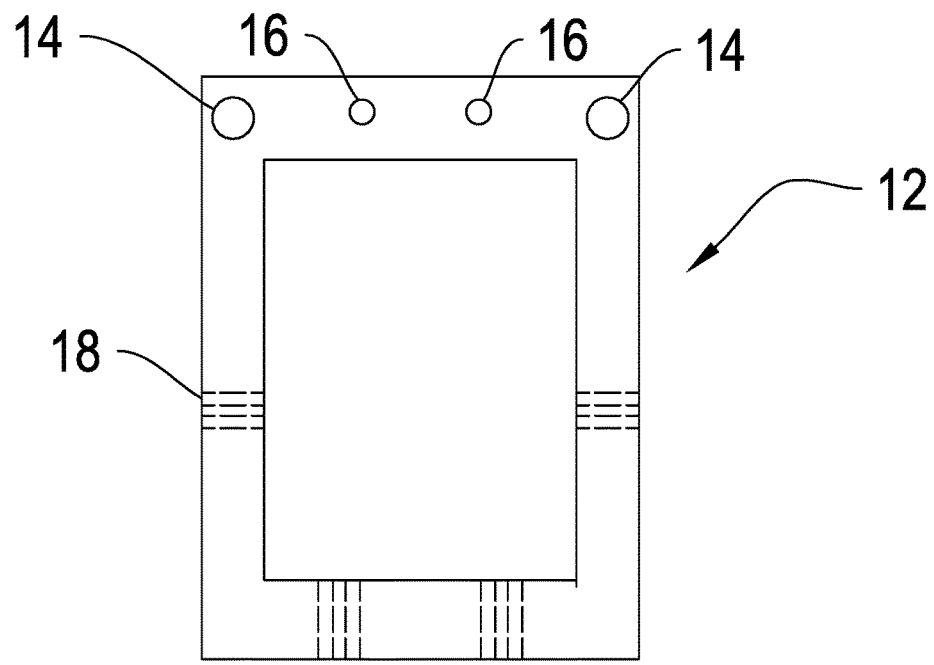
FIG. 2 depicts a urethane frame for the carbon nanotube thermophone of the present invention.

As shown in FIG. 2, the mechanical section is a urethane frame 12 (nominally 6.5 inches long×5.0 inches wide×0.5 inches thick in the present example) without any encapsulateant acoustically transparent housing. In the preferred embodiment, there are twenty apertures (holes) thru the frame 12. Two mounting holes 14 of the twenty apertures; each with an inner diameter of 3/8" are at the upper (top) left and right corners such that the urethane frame 12 can be mounted on test fixtures for calibration or for a specified underwater vehicle.

Two screw holes 16 of the twenty apertures are at the middle of the top of the frame 12. The screws holes 16 are sized for a cable holder 17 when a cable is used with the thermophone 10. The remaining sixteen holes 18 are for routing wires that can be used to position and secure wooden dowel spacers 20 (See FIG. 1).

Returning to FIG. 1, the acoustic section of the thermophone 10 is the square shaped (preferably 3 inch length×3 inch width×0.1 inch thick) carbon nanotube material chip 40. The carbon nanotube material chip 40 is positioned within the urethane frame 12. The wooden spacers 20 assist in positioning and securing the carbon nanotube material chip 40.

Figure 3:
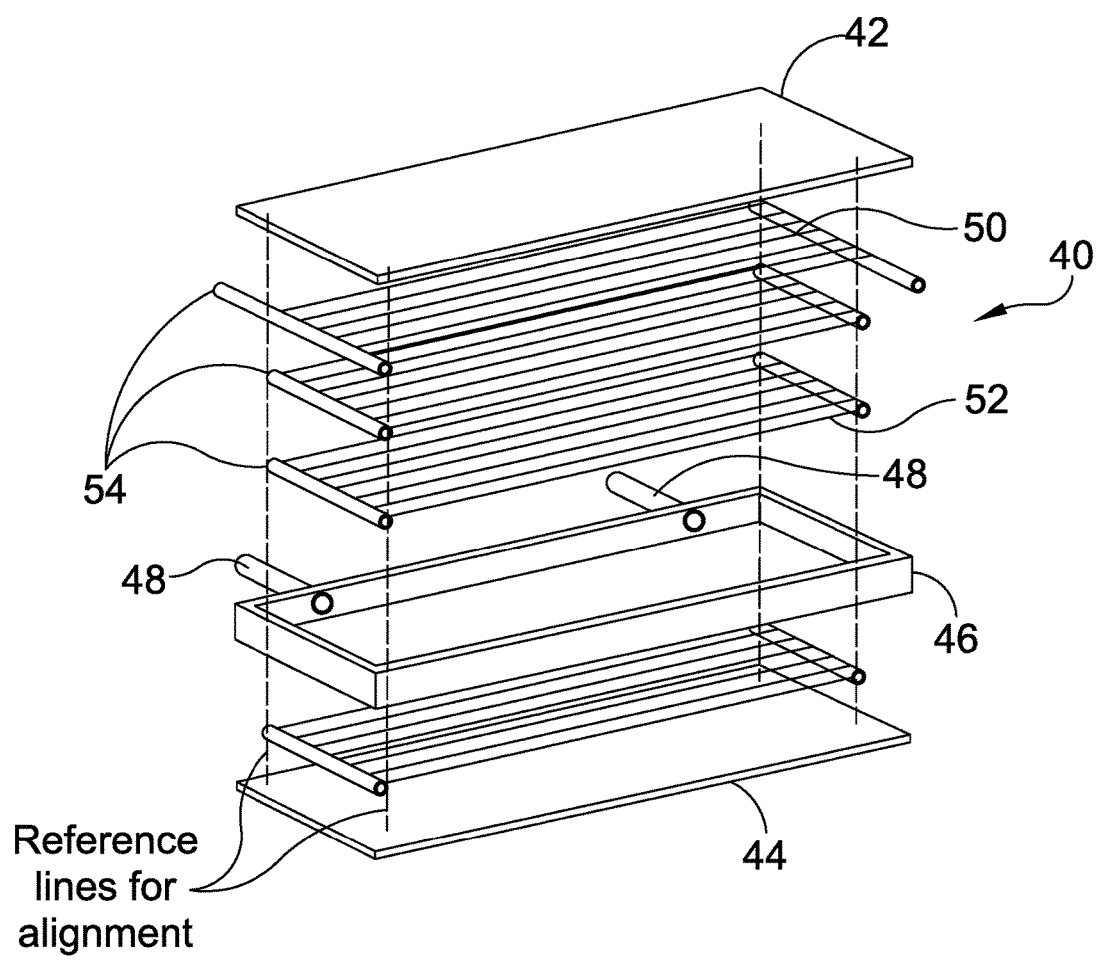
FIG. 3 depicts a carbon nanotube tranducer for use with the thermophone of the present invention.

As shown in FIG. 3, the carbon nanotube material chip 40 includes a first ceramic shell 42 and a second ceramic shell 44, both of which are high temperature rated such as aluminum nitride (AlN) with a melting point of 2200 degrees Celsius. The first (top) ceramic shell 42 and the second (bottom) ceramic shell 44 serve not only as the protective walls of a housing of the carbon nanotube material chip 40 but also act as acoustic windows to match the frequency and acoustic radiation medium.

The top shell 42 and the bottom shell 44 are exposed directly to the liquid medium. Though the acoustic impedances between the radiating ceramic shells and the liquid (water) medium are not acoustically matched; acoustic signals can still be observed in the liquid medium due to large acoustic wavelengths in the water medium.

A high temperature rated sealant gasket 46 is used to enclose the thermal housing of the material chip 40 where at least two gas holes 48 are available for interior heavy gas filling. The gasket 46 is preferably made of high-temperature rated rubber with a maximum temperature of 300 degrees Celsius or greater with an approximately one millimeter thickness. The thickness of the gasket 46 is defined by balancing two factors. One factor is to ensure the enclosed active CNT sheets float without touching either side of the top shell 42 and the bottom shell 44 during operation. The second factor is to have the whole assembly as thin as possible. The heavy gas used is preferably Argon; however, SF6 gas or Xenon gas can be used with marginally improved thermoacoustic efficiency but at a significantly higher expense.

The active thermoacoustic transduction is by a first CNT sheet 50, a second CNT sheet 52 and a "N" layer of CNT sheets. The deciding factor on the number of CNT sheets is the number of parallel sheets determined to provide a matching electrical impedance with a power amplifier (not shown) so that there is no loss of resistive energy in the transformation between the amplifier and the material chip 40. The number of layers "N" is determined by the carbon nanotube electrical impedance of each layer as well as the wiring in series or in parallel of each of the layers of CNT sheets. Each CNT sheet has an electrode 54 at both ends. The electrical impedance of each sheet can be measured by an impedance analyzer.

If sound energy only radiates from the top of the material chip 40, the top shell 42 serves as an acoustic window. The acoustic impedance (defined as the product of material density and sound speed) of the top shell 42 should match the radiation medium for higher efficiency. This radiation matching can be realized using plates that are significantly thinner than the operating acoustic wavelengths. In this configuration, the bottom shell 44 can be designed as a heat sink by a different type of high temperature rated compound, such as copper material. An example of a heat sink is a heavy metal such as iron or steel or even a heavy ceramic block.

Unlike conventional vibration-based transduction principles, the CNT material chip 40 is based on a thermal acoustic principle where electric energy is converted to a heat format, which in turn is linked to acoustic energy per the ideal gas law. One of the implications is that when the CNT material chip 40 is driven at a frequency; the acoustic field generated by the CNT material chip occurs at twice the frequency. In fact, only noise is observed at the primary driving frequency while a full acoustic output occurs at twice the frequency.

As shown in FIG. 1, the electrical part of the thermophone 10 includes a cable pigtail 60 (twenty inches in length for this use) and a Underwater Sound Reference Division (USRD) F37 standards transducer cable (two wires for positive and negative with shielding and capable of driving electrical signals from 10 Hz to 37 kHz with thirty meters in length for this use). A first end of the cable 60 is soldered to the carbon nanotube material chip 40 at the electrodes 54 of the material chip. The quantity of cables 60 that are used can vary depending on the number of carbon nanotube layers electrically connected by their corresponding electrodes 54. The other end of the cable 60 is electrically connected to the USRD F37 standard cable (not shown). A high temperature (approximately 300 degrees Celsius) rated silicon sealant material 62 is used to for attachment points on the thermophone 10.

Advantages and features of the CNT thermophone 10 are that the thermophone comprises a thermally and acoustically transparent underwater projector that is well protected when used in water. Also, one of the carbon nanotube characteristics is the small size and the light weight of the nanotube fibers. This feature permits the generation of low frequency and broadband sound in a relatively small package.

Another carbon nanotube characteristic is the thermal acoustic transduction as opposed to traditional underwater acoustic transducers that utilize electromechanical vibrations. During the thermal acoustic transduction process, sound energy is created from heat as opposed to electromechanical vibrations.

To prevent heat from accumulation, the carbon nanotube material chip 40 is not covered by urethane—due to the potential of high temperature radiation by the carbon nanotube material chip.

Furthermore, the wooden spacers 20 provide heat insulation between the carbon nanotube material chip 40 and the urethane frame 12. Additionally, high temperature rated silicone is applied to a cavity between the spacers 20 and the material chip 40.

The foregoing description of the preferred embodiments of the invention has been presented for purposes of illustration and description only. It is not intended to be exhaustive or to limit the invention to the precise form disclosed; and obviously many modifications and variations are possible in light of the above teaching.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A thermophone comprising:
    a frame having a rectangular outer perimeter and a rectangular inner perimeter with a first plane and a second plane;
    a square carbon nanotube chip positioned within the inner perimeter of said frame, said carbon nanotube chip including at least one thermos-radiation surface and capable as an acoustic radiation surface with at least two electrodes extending from said carbon nanotube chip;
    a first cable having a first end and a second end with a length of twenty inches, said first cable electrically connected at the first end to said electrodes;
    a second cable electrically connected to said first cable at the second end of said first cable; and
    a high temperature rated silicon sealant applied at contact points of said carbon nanotube to said frame and said first cable.

2. The thermophone in accordance with claim 1, wherein a material of said frame is urethane.

3. The thermophone in accordance with claim 2, wherein said carbon nanotube chip is sized at three inches in length and width with a one inch thickness.

4. The thermophone in accordance with claim 3, wherein the outer perimeter of said frame is six and one-half inches in length and five inches in width and said frame has a thickness of one half of an inch.

5. The thermophone in accordance with claim 4, said thermophone further comprising a first pair of apertures spaced apart and positioned between the outer perimeter and the inner perimeter of frame, said first pair of apertures thru said first plane and said second plane.

6. The thermophone in accordance with claim 5, said thermophone further comprising a second pair of apertures spaced apart and in alignment with and between said first pair of apertures, said second pair of apertures thru said first plane and said second plane.

7. The thermophone in accordance with claim 6, said thermophone further comprising a cable holder mounted at said second pair of apertures.

8. The thermophone in accordance with claim 7, said thermophone further comprising a plurality of spacers capable of positioning said carbon nanotube material chip within said frame.

9. The thermophone in accordance with claim 8, wherein said silicon sealant is positioned between said spacers and said carbon nanotube chip.

* * * * *